Feb. 9, 1943.                    A. ALFORD                     2,310,202
                         ELECTRONIC BEACON MODULATOR
                            Filed March 1, 1941
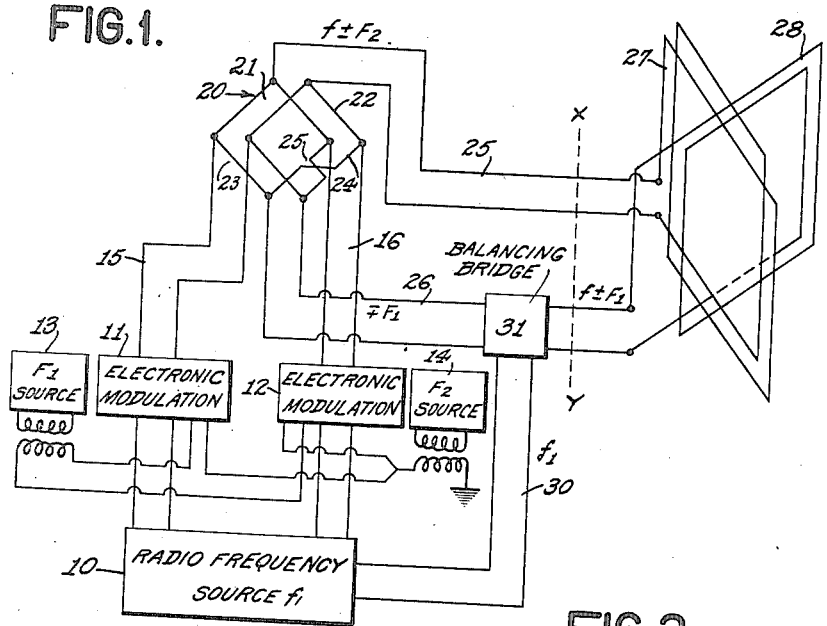
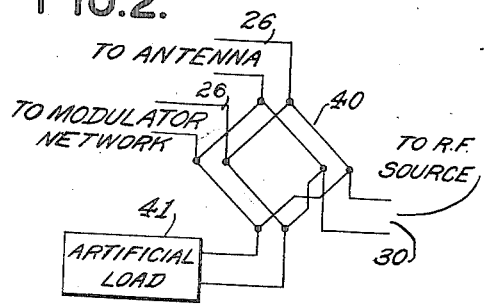
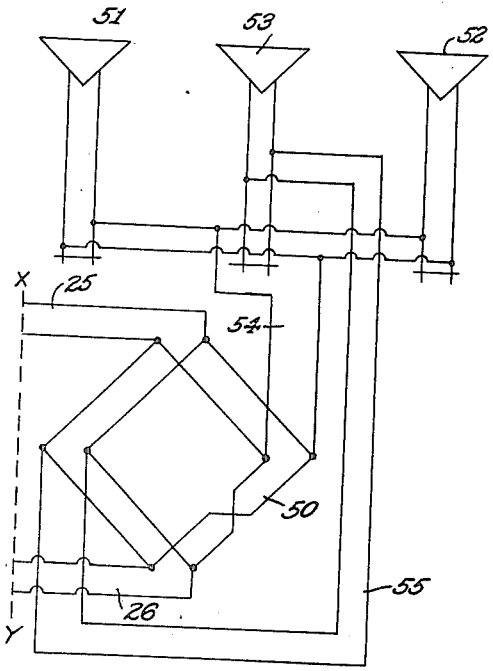
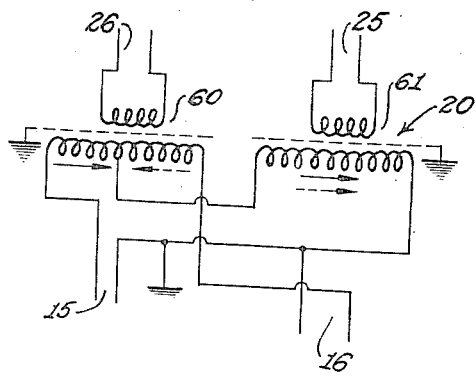
INVENTOR.
ANDREW ALFORD
BY
ATTORNEY Patented Feb. 9, 1943

2,310,202

UNITED STATES PATENT OFFICE 2,310,202

ELECTRONIC BEACON MODULATOR

Andrew Alford, New York, N. Y., assignor to Federal Telephone & Radio Corporation, a corporation of Delaware Application March 1, 1941, Serial No. 381,301

8 Claims. (Cl. 250—11)

This invention relates to radio beacon modulating systems, and more particularly to an electronic modulation system for radio beacons.

In radio beacons particularly for lateral guiding of craft along a particular course, it is common practice to transmit two different modulated beams in overlapping space relation and to use the zone of overlap where the signal intensities are received with equal intensity to define a guiding zone or line. In this type of beacon difficulties arise when electronic means such as vacuum tubes are to supply the modulating signals, since any change in the relative strengths of the modulating signals causes an apparent shifting of the course line. Thus, if one of the modulators becomes weakened due to partial tube failure, for example, the course is shifted to one side and may lead the craft to a position of danger. Largely because of this danger, mechanical modulating systems have been used in such course guiding beacons.

In accordance with my invention I provide a beacon system of the type described above, using electronic modulators, in which the danger of course shifting caused by partial failure of one of the modulators is avoided.

It is a principal object of my invention to provide a radio beacon using electronic modulation, which is reliable in operation and free from dangerous shiftings.

It is a further object of my invention to provide a radio beacon wherein the dangers of shifting a course are avoided.

These and other objects of my invention are accomplished according to one feature of my invention, by using two radiating systems which produce overlapping field patterns, and supplying to each antenna the modulated energy over a bridge circuit. The modulating signals are supplied to both modulators, but under balanced conditions of the bridge the modulating signal supplied to one radiating system, is balanced out at the point at which the other radiating system is connected so only the normal signals are transmitted on each side of the course. Should the amplitude of one modulating signal change with respect to the other, however, the bridge is no longer balanced, and a proportion of the other signal energy is transmitted from each antenna. Consequently such a change in signal amplitude merely causes a decrease in signal strength of the beacon and a broadening of the course line but causes no shifting of the guiding course.

A more complete understanding of my invention as well as other objects and features thereof may be had by reference to the description of a particular embodiment of my invention made in connection with the accompanying drawing in which Fig. 1 illustrates diagrammatically one form of beacon arrangement in accordance with my invention;

Fig. 2 illustrates one form of balancing network used for introducing carrier frequencies into the line;

Fig. 3 illustrates a coupling arrangement for an alternative form of radio beacon, and Fig. 4 illustrates an alternative bridge network which may be used in connection with the beacons of Figs. 1 or 3.

In Fig. 1, 10 represents a source of radio frequency energy $f_1$ supplying energy to two modulators 11 and 12. Numerals 13 and 14 represent two sources of signal energy $F_1$, $F_2$, which may, for example, be sources of 90 and 160 cycles energy. Source 13 is coupled to modulators 11 and 12 so as to modulate the radio frequency energy $f_1$ in both modulators with 180 degree phase displacement of the modulating energy and source 14 is coupled to both these modulators 11 and 12 to modulate the energy in phase. At 20 is provided a balancing bridge arrangement, in this figure shown as a transmission line having four arms 21, 22, 23, 24. In one arm 24, for example, is provided a phase shifting means for obtaining a phase reversal of the energy shown as a transposition 25. Energy from modulators 11, 12 is applied to diagonally opposite points on network 20 by means of transmission lines 15, 16. The other diagonally related points of the network are coupled to transmission lines 25, 26, the other ends of which are coupled to transmitting antennae 27, 28, shown as crossed loops. It is evident that any desired form of antenna may be used, although in the present instance right angularly related loop antennae are disclosed.

Energy from modulators 11, 12, is supplied to the bridge in conjugate relation so that energy from 11 will not be fed into 12. However, energy from both of these modulators will be fed to transmission lines 25, 26. Since the arms 21, 22 are of equal length the carrier frequency energy $f_1$ and the modulating energy $F_2$ will arrive at line 25 in phase and for this reason will add together. However, the modulating energy at $F_1$ is in phase opposition on the two portions of the carrier frequency arriving at line 25 and consequently this energy will be neutralized and only the carrier frequencies with said bands from source F₂ will go out over line 25 to antenna 27. Energy from modulators 11, 12, on the other hand, will arrive at line 26 with the carrier frequency and the modulating energy F₂ in phase opposition because of transposition 25 so that these energies will tend to neutralize, applying to line 26 only side band frequencies from modulating source F₁. In order that antenna 28 may properly transmit a complete signal wave, carrier frequency $f_1$ is supplied to line 26 directly from source 10 over line 30. Thus antenna 28 will radiate carrier frequency and side band $f_1$. Line 30 may be coupled directly to line 26, if desired, since the amount of energy which will feed back to the input of the modulators will have no harmful effect. However, it is preferable in many instances to assure that energy from line 30 does not arrive back at the input of the modulators and for this reason I may provide a balancing bridge network at 31.

From the above described circuit it is clear that so long as bridge 20 remains balanced and the energy supplied from these modulators to the bridge are of equal magnitude only energy of carrier plus one or the other of the side bands will be transmitted from the separate antennae 27, 28. However, should either of the modulators become weakened so that the amplitude of the energy transmitted therefrom is reduced, then there will no longer be a complete cancellation of the modulating energy at either of the transmission lines. For example, suppose modulator 11 becomes weakened so that it no longer carries the same amplitude energy to the bridge. It is clear that then energy from source 13 will no longer completely neutralize in line 25 and this line will convey carrier frequencies with both the strong side band F₂ and weaker side bands of F₁. Similarly, carrier frequency and the side band energy from source 14 will no longer neutralize in line 26, and this line will also carry side band frequency F₁ and a smaller amount of carrier and side band frequency at F₂. However, because of the bridge network it is clear that the amount of energy sent to each of lines 25, 26, will be substantially equal so that energy radiated from antennae 27 and 28, will be maintained substantially equal and no shifting of the course will occur. The dangers attending such course shifting are therefore overcome. Furthermore, should either modulators entirely fail to function then both antennae would radiate the same signals and no course whatever would be defined. In this event it is clear that since no course is defined, the pilot would not be misled into following a false course and would realize the condition of the beacon and take added precautions accordingly.

With the modulation arrangement according to my invention, the usual difficulties attendant electronic modulators are overcome, since it is apparent that reduction in amplification power of any of the tubes in the modulator will not cause a course shift indication. Prior to my invention the danger of the shifting of a course consequently leading an airplane into a dangerous position has been considered inherent in electronic modulator beacon systems.

In Fig. 2 is illustrated a bridge arrangement which may be used as a balancing bridge circuit 31 of Fig. 1. This circuit comprises a network 40 similar to that disclosed at 20 in Fig. 1. The modulator network and radio frequency source are connected at diagonally opposite points on the bridge to provide a conjugate relation so that energy from line 30 cannot reach the input of the modulators. The antenna and an artificial load 41 are connected to the other diagonally opposite points of the bridge. Energy in coming over line 30 then is transmitted to the antenna 26 and to artificial load 41 wherein half the energy is dissipated for the purpose of maintaining the balance. It is clear that in place of this transmission line bridge 40 other known types of hybrid networks may be utilized whenever the frequency is sufficiently low so that their use is feasible.

In Fig. 3 is illustrated an alternative form of beacon which may be utilized to replace the crossed-loop beacon arrangement of Fig. 1. In this arrangement energy from lines 25, 26 is fed to the opposite diagonals of a bridge network arrangement 50. An antenna array comprising three radiators 51, 52, 53, is provided, these antennae are shown schematically as radiators of a previously proposed type for producing horizontally polarized waves, and are preferably so arranged that the spacings between antenna 53 and either of the other antennae is in the neighborhood of 160 electrical degrees. Energy from lines 25, 26, is opposed in phase and fed over line 54 to antennae 51, 52, so that only the side band energy is radiated from these antennae. At the same time energy from lines 25, 26, is fed over line 55 to antenna 52, the carrier frequency and side band energy from the two lines adding in phase in line 51 so that central radiator 53 radiates the carrier and both side band frequencies. With such an arrangement a sharp two-course beacon is produced which may be used as a localizer or course beacon. A more complete explanation of this beacon operation and of the antenna units illustrated may be had by reference to my copending application for U. S. Letters Patent Ser. No. 270,173, filed April 26, 1939. If low radio-frequency energy is used a hybrid coil or transformer arrangement may be utilized to replace network 50.

In Fig. 4 is illustrated an alternative transformer arrangement which may be used to replace the transmission line bridge network 20 of Fig. 1. A network of similar design may likewise be used to replace networks 40 and 50 of Figs. 2 and 3. The network 20 of Fig. 4 is represented as two transformers 60, 61, preferably of the shielded type connected in the well known hybrid fashion. As indicated by the solid and dotted arrows, respectively, which represent the current directions in the transformers by positive surge from lines 15 and 16, energy from line 15 is applied by the transformers to line 25 cophasally while energy from line 16 is applied to line 26 in phase opposition. The primary of transformer 60 is symmetrically connected so that the same magnitudes of excitation are given to the transmission line by a given power from line 15, as by the same power from line 16. Step-down ratios may be used in the transformers in order to secure impedance match of the lines 25, 26, which are preferably matched to the impedance of the radiators.

While I have disclosed a few preferred embodiments of my invention it should be distinctly understood that this disclosure is given merely by way of example and not as a limitation on the scope thereof. Any form of beacon radiators may be used as desired and various forms of balancing the network may be also used. What I consider to be my invention and about which I desire to secure protection is embodied in the accompanying claims.

What I claim is:

1. A radio beacon comprising a source of radio frequency energy, a source of first distinctive signals, a source of second distinctive signals, means for separately modulating portions of said radio frequency energy in phase with said first distinctive signals, means for separately modulating portions of said radio frequency energy in phase opposition with said second distinctive signals, means for combining said modulated carriers in phase, whereby said second distinctive signals are neutralized to produce resultant signal modified energy, means for combining said modulated carriers in phase opposition, whereby said first distinctive signal is neutralized to produce other signal modified energy and means for radiating said resultant signal modified energies in overlapping space relation.

2. A radio beacon according to claim 1, further comprising means for supplying unmodulated radio frequency energy to said other modified signal energy.

3. A radio beacon according to claim 1, wherein said means for combining said modulated radio frequency energy comprises, a bridge arrangement for maintaing said modulated portions in conjugate relation, under conditions of equal amplitude condition of said modulated radio frequency energy portions.

4. The method of producing a radio beacon which comprises, modulating radio frequency energy in phase at two points with a first distinctive signal, modulating said radio frequency energy at said two points in phase opposition with a second distinctive signal, combining said modulated carriers in phase to produce a resultant carrier modulated with said first distinctive signal only, combining said modulated carriers in phase opposition to produce a resultant carrier modulated with said second distinctive signal only, and radiating said resultant modulated carriers in overlapping relation.

5. A radio beacon system comprising, means for radiating energy in different overlapping directions to define a beacon course, a pair of transmission lines for conveying energy to said radiating means, a source of carrier frequency energy, two sources of signal energy of distinctive characteristics, separate modulating means for modulating said carrier energy with said signal energy, means for supplying energy from one of said signal sources to both said modulators in phase coincidence, means for supplying energy from said other signal source to both said modulators in phase opposition, a bridge circuit with means producing a phase reversal in one arm thereof, means for coupling said modulator outputs to diagonally opposite points on said bridge, and means for coupling said radiators to the other diagonally related points on said bridge circuit.

6. A radio beacon system according to claim 5, wherein said bridge circuit comprises a four armed transmission line bridge.

7. A radio beacon system according to claim 5, wherein said bridge circuit comprises a pair of transformers, and means for interconnecting said transformers in hybrid bridge arrangement.

8. A radio beacon system according to claim 5, further comprising means for supplying energy from said carrier frequency source directly to one of said transmission lines.

ANDREW ALFORD.